(12) United States Patent
Levy

(10) Patent No.: US 6,275,886 B1
(45) Date of Patent: Aug. 14, 2001

(54) MICROPROCESSOR-BASED SERIAL BUS INTERFACE ARRANGEMENT AND METHOD

(75) Inventor: Paul S. Levy, Chandler, AZ (US)

(73) Assignee: Philips Semiconductor, Inc., Tarrytown, NY (US)

( * ) Notice: Subject to any disclaimer, the term of this patent is extended or adjusted under 35 U.S.C. 154(b) by 0 days.

(21) Appl. No.: 09/163,061

(22) Filed: Sep. 29, 1998

(51) Int. Cl.[7] ................................................. G06F 13/00
(52) U.S. Cl. ................................. 710/129; 710/62
(58) Field of Search ............................................... 710/129

(56) References Cited

U.S. PATENT DOCUMENTS 6,173,348 * 1/2001 Hewitt ................................. 710/107
6,185,622 * 2/2001 Sato ..................................... 709/233

* cited by examiner

Primary Examiner—David Wiley

(57) ABSTRACT

A microprocessor-based serial bus interface circuit arrangement. The interface circuit arrangement includes a processor, a read-only memory circuit, a random access memory circuit, and a port interface circuit arrangement coupled to a local bus. The processor is configured and arranged to perform selected link layer functions of the IEEE 1394 standard. The read-only memory is configured with instructions for causing the processor to perform the selected link layer functions, and the random access memory is utilized by the link layer software. The port interface circuit arrangement is arranged to couple to the 1394 standard serial bus and transfer data between random access memory and the 1394 bus via the local bus responsive to the processor performing the selected link layer functions.

16 Claims, 4 Drawing Sheets

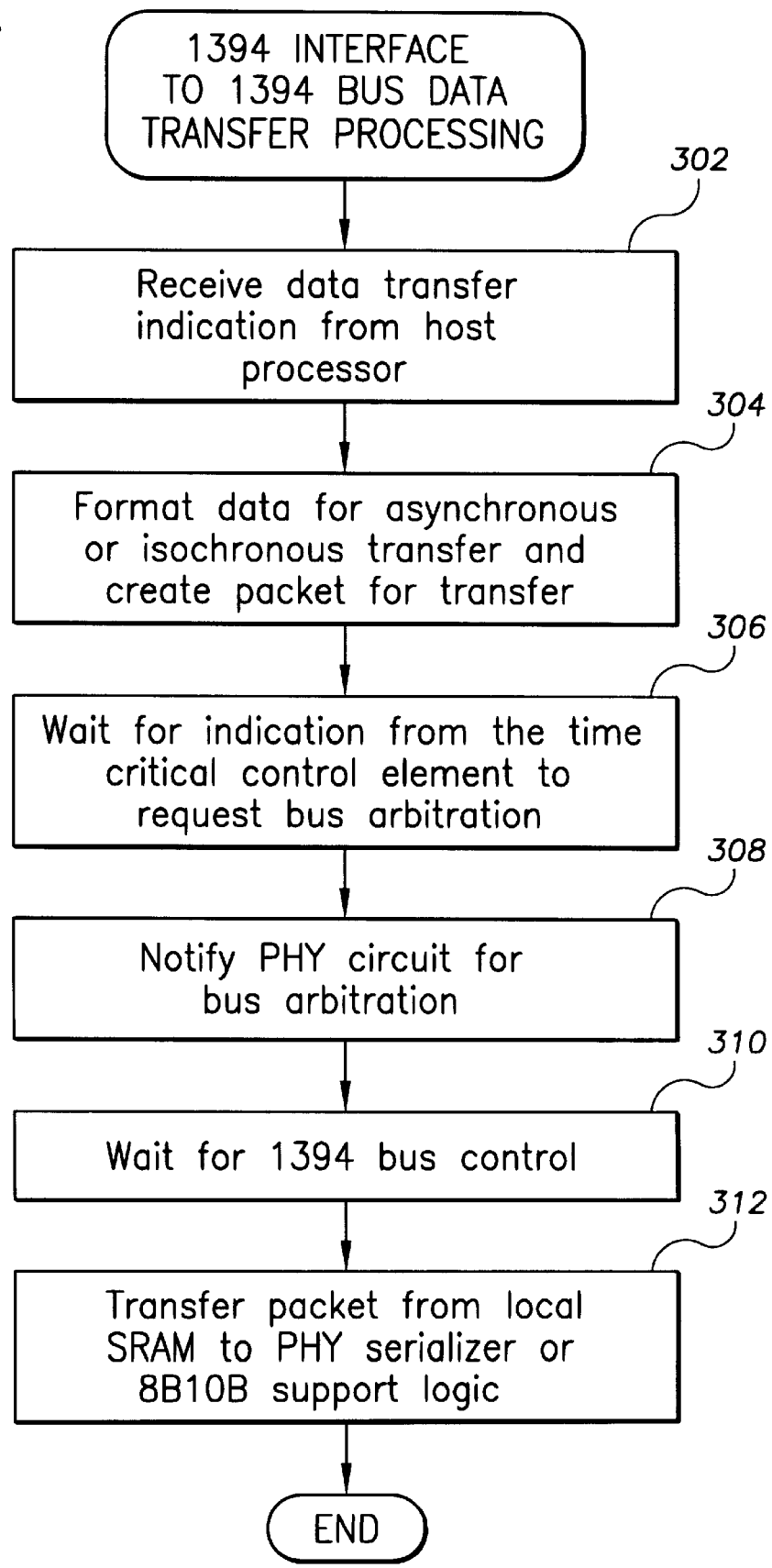

MICROPROCESSOR-BASED SERIAL BUS INTERFACE ARRANGEMENT AND METHOD

FIELD OF THE INVENTION

The present invention is generally directed to serial buses for computer systems, and more particularly, to a microprocessor-based interface arrangement for IEEE 1394 buses.

BACKGROUND OF THE INVENTION

The FireWire® serial bus architecture was originally developed by Apple Computer. The objectives that drove development of the FireWire serial bus were ease of use, high rate of data transfer, support for isochronous applications, very large memory mapped address space and others. The IEEE formalized the FireWire architecture in the IEEE 1394–1995 specification. This standard will be hereinafter referenced as the "IEEE 1394 standard" or just the "1394 standard." A description of the IEEE 1394 system architecture is provided in the book, "FireWire System Architecture : IEEE 1394" by Don Anderson and published by MindShare, Inc., 1998. Details regarding the IEEE 1394 standard can be found in the "IEEE 1394–1995," "IEEE 1394.A," and "IEEE 1394.B" specifications, the contents of which are herein incorporated by reference.

Texas Instruments and other companies presently have a variety of chip sets for IEEE 1394 applications. The chip sets are generally comprised of either separate chips that implement the link and PHY layers of the 1394 standard, or a single chip that implements both the link and PHY layers. The link layer generally performs packet formatting for data to be transferred to and from a locally coupled host system, while the PHY layer provides the physical interface to the serial bus.

The commercially available chip sets are generally hard-wired solutions that promote easy integration into specific applications. However, once the chip sets are integrated into a product, for example a digital camera, problems uncovered in the link/PHY chip set may be expensive to remedy. Furthermore, improvements in and extensions to the 1394 standard may make the chip set obsolete. Therefore, a link/PHY circuit arrangement that addresses the above identified problems is desirable.

SUMMARY OF THE INVENTION

The present invention is a microprocessor-based interface circuit arrangement for IEEE 1394 buses. In one embodiment, the circuit arrangement comprises a local bus to which are coupled a processor, a read-only memory circuit, a random access memory circuit, and a 1394 port interface circuit arrangement. The processor is configured and arranged to perform selected link layer functions of the IEEE 1394 standard. The read-only memory circuit is configured with instructions that cause the processor to perform the selected link layer functions. The random access memory circuit is arranged for storage of data manipulated by the link layer functions. The 1394 port interface circuit arrangement is arranged to couple to the 1394 standard serial bus and transfer data between the random access memory and the 1394 bus via the local bus responsive to the processor performing the selected link layer functions.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 3 is a flowchart of processing performed in transferring data from the interface 200 to the 1394 bus 101, in accordance with an example embodiment of the invention.

Figure 1:
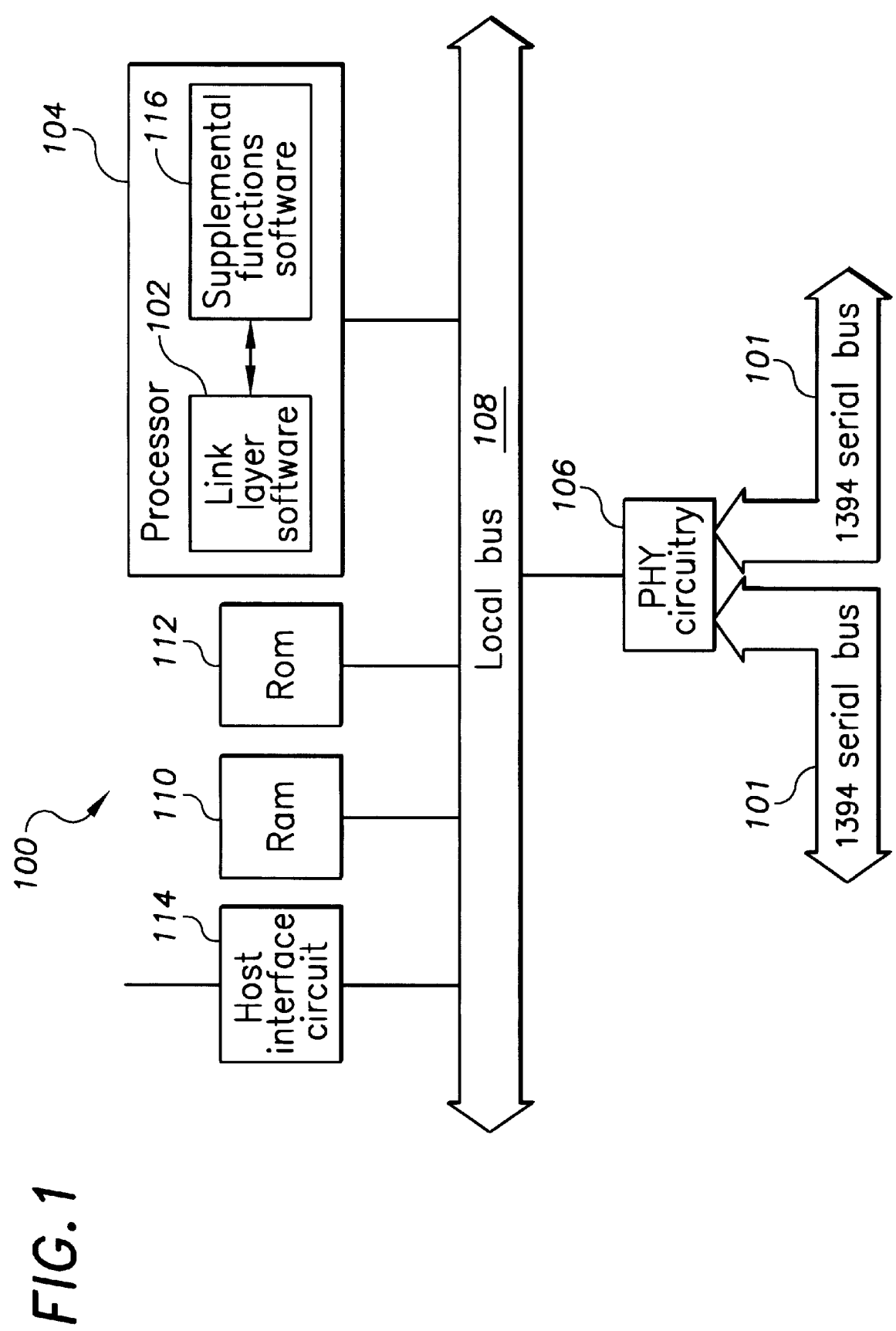
FIG. 1 is a block diagram of an IEEE 1394 bus interface arrangement in accordance with an example embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of arrangements for providing an interface to a serial bus. The invention may be particularly advantageous in applications that require an interface to an IEEE 1394 serial bus. While the present invention is not so limited, an appreciation of various aspects of the invention may be gained through a discussion of a 1394 based embodiment.

FIG. 1 is a block diagram of an IEEE 1394 bus 101 interface arrangement 100 in accordance with an example embodiment of the invention. The link layer of the 1394 standard is implemented as link layer software 102 that executes on a processor 104. The processor 104 may be, for example, an advanced RISC microprocessor (ARM) or another commercially available programmable microprocessor.

The PHY layer of the 1394 standard is implemented with hardware shown as PHY circuitry 106. The processor 104 and PHY circuit 106 are both coupled to the local bus 108, which includes data, address, and control lines.

The arrangement of FIG. 1 is generally structured to accommodate two classes of processing: first, where a response is required in a very short time; and second, where data formatting is required. Generally, data formatting can be handled in a software implementation because data formatting is not time critical. In addition, housekeeping functions are generally not time critical and can be implemented in software. For example, generating data for a control and status register (CSR) array (not shown) is performed by the microprocessor, and data objects are kept in local RAM 110.

A RAM 110 is coupled to the local bus 108 and is arranged as a workspace for the link software 102 for formatting data for transmission as well as storage of software patches for fixing problems and providing enhancements. The ROM 112 is also coupled to local bus 108 and is provided for storage of the link layer software 102. It will be appreciated that the link layer software 102, while shown within the processor block 104 for the purpose of illustrating execution of the instructions, is actually stored in the ROM 112.

A host interface circuit 114 is coupled to the local bus 108 and provides the interface to applications implemented on a host system (not shown). The host system may be, for example, a personal computer which hosts an application for interacting with a digital camera or an application for interacting with an audio-visual source.

The invention provides the capability to off-load processing conventionally performed by a host processor to the link/PHY interface 100. For example, the supplemental functions software 116 executing on the processor 104 can be used to reassemble MPEG data packets. In addition, the supplemental functions may include intelligent retry for message transmission and transmission of disk drive input/output packets for other applications.

Figure 2A:
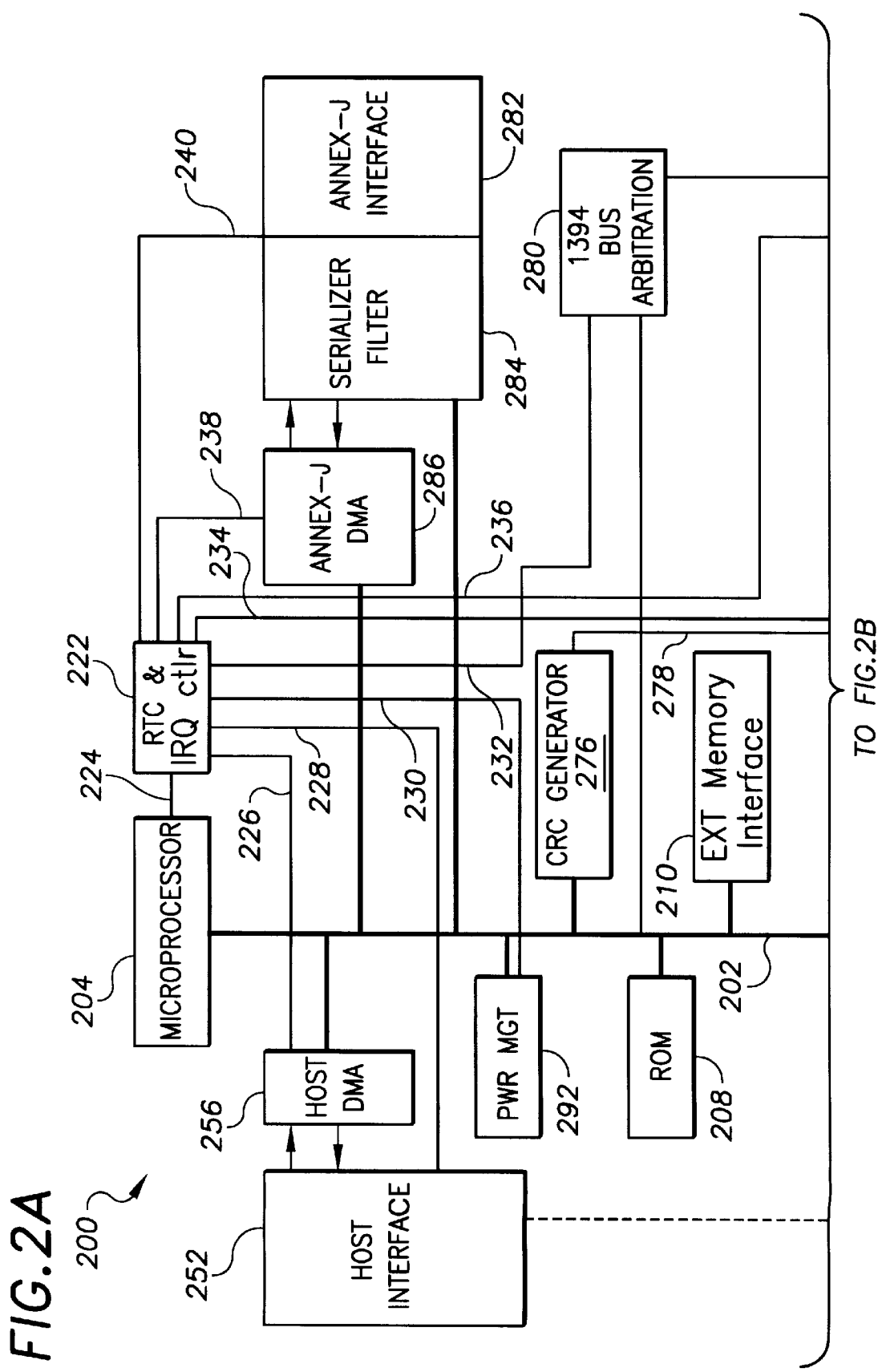
FIG. 2 is a detailed block diagram of a link/PHY interface arrangement 200 according to an example embodiment of the invention.
Figure 2B:
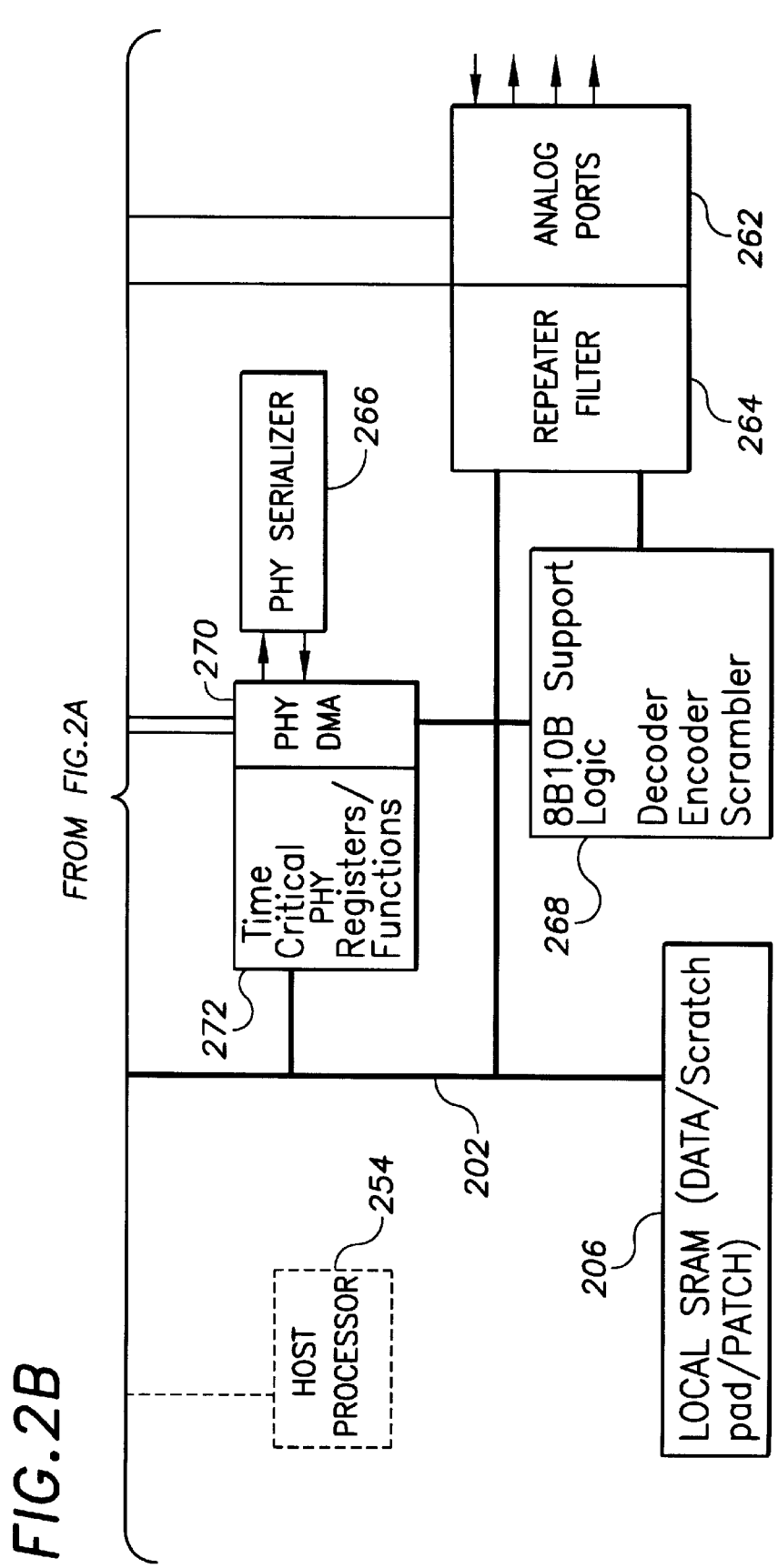

FIG. 2 is a detailed block diagram of a link/PHY interface arrangement 200 according to an example embodiment of the invention. The interface arrangement 200 is generally centered upon a single bus architecture in which the various control and storage elements are coupled to a single bus 202. The bus 202 includes data, address, and control signal lines between the various elements.

The microprocessor 204, implemented with an ARM, for example, is coupled to the bus 202 and executes links layer software 102. The local SRAM element 206 provides storage for a workspace for formatting data for transmission as well as storage for software patches for fixing problems and providing enhancements. The patches can be stored, for example, on the host system and accessed via the host interface, or off-board in ROM storage. The local SRAM is configured with sufficient memory for the link layer software to format data as required by the 1394 standard and also for storage and manipulation of audio, visual, and FTP2 packets, for example.

The ROM element 208 is provided for storage of the link layer software 102. It may also include the supplemental functions software 116 as described in FIG. 1. An external memory interface 210 is coupled to the bus and provides for expansion memory if needed by the system.

The real time clock (RTC) and interrupt request (IRQ) controller 222 is coupled to and provides clock signals to the various functional units of the interface 200. The functional units generate interrupt signals that are sent to the IRQ controller 222, which then interrupts the microprocessor 204. Line 224 that couples the microprocessor 204 to the RTC/IRQ controller 222 represents both the clock signal and interrupt signal lines input to the microprocessor. Lines 226, 228, 230, 232, 234, 236, 238, and 240 represent the clock signal lines input to the respectively coupled functional units and the interrupt signal lines input from the functional units to the RTC and IRQ controller 222.

The host interface 252 is arranged to be coupled to a host processor 254 and comprises a conventional interface such as PCI, for example. The host direct memory access (DMA) controller 256 reads data from and writes data to the local SRAM 206. Data transfer requests from the host processor 254 are written to the local SRAM 206 by the host DMA controller 256, and the host DMA controller then signals, via an interrupt, the microprocessor 204 that a request is available to be processed. The microprocessor 204 signals the host DMA controller 256 via the bus 202 when data are available in the local SRAM to be read by the host DMA controller 256 and transferred to the host processor 254.

The analog ports 262 include the hardware and physical cable interfaces for the 1394 standard and may include a single or multiple ports as provided in the standard. The analog ports along with the repeater filter 264 provide the point-to-point communication between inter-coupled 1394 nodes. The repeater filter 264 and analog ports 262 are coupled to the IRQ controller 222 for interrupting the microprocessor for services as needed for the reception or transmission of data packets.

The PHY serializer 266 and the 8B10B support logic 268 are two paths through which data arrives and is transferred out of the interface 200. The PHY serializer 266 supports functions from the IEEE 1394-A standard. This block performs the S100/S200/S400 quadlet parallel to serial conversion, and the serializer 266 converts parallel data from the bus 202 to serial data for transmission via the analog ports 262. The serializer 266 also performs data strobe encoding.

The 8B10B support logic 268 implements the PHY functions as set forth in the IEEE 1394-B standard. These functions are generally required to be implemented in hardware because of speed requirements, and include functions such as, scrambler, synchronization, and byte encoding.

The PHY DMA controller 270 is coupled to both the PHY serializer 266 and the 8B10B support logic 268, either via a point-to-point connection or a bus connection. The PHY DMA controller provides intermediate storage of data transferred between the local SRAM element and the analog ports. For outgoing data, the transfer is initiated by the link layer software 102 executing on the microprocessor 204. For incoming data, the PHY DMA controller interrupts the microprocessor 204 via the interrupt controller 222, and the microprocessor signals the PHY DMA controller via bus 202 when the bus is available for transfer of the data to the local SRAM 206.

The circuit element 272 includes the time critical registers and functions to which the 8B10B support logic element 268 and PHY serializer 266 need to respond within a few clock cycles. These registers include, for example, transaction labels, cycle timers, and retry status, and the functions include, for example, ACK and response packet generation, as well as arbitration tokens.

The cyclic redundancy check (CRC) generator 276 both checks for validity of incoming packets and generates the appropriate CRC codes for outgoing packets. For incoming packets, the CRC generator reads the packet data from the PHY DMA controller via data/control line 278 and therefrom generates a CRC code. The generated CRC code is compared with the CRC code in the packet, and the link layer software 102 on the microprocessor 204 is signaled via a control line on the bus 202 when incoming data are invalid.

For outgoing packets, the CRC generator reads the packet data from the local bus 202, generates a CRC code, and provides the CRC code to the PHY DMA controller for inclusion in the packet which is then provided to the PHY serializer 266 or the 8Bl0B support logic 268.

The 1394 bus arbitration circuit 280 is coupled to the local bus 202, the RTC/IRQ controller 222, and analog ports 262. The link layer software 102 on microprocessor 104 signals the bus arbitration circuit 280 via a control line on bus 202 when there is data available in the local SRAM 206 to be transferred out on the analog ports 262. The arbitration circuit 280 then arbitrates with other nodes present on the 1394 bus for control of the bus. When control is obtained, the bus arbitration circuit 280 interrupts the microprocessor 204 via the IRQ controller 222 to signal that the 1394 bus is available.

The annex-j interface and serializer filter 284 circuit elements are arranged to couple the interface 200 to an external PHY interface (not shown). For example, if there is only a single port provided by the analog ports 262, the single port can be decoupled from the interface 200, and an external multi-port PHY interface can be coupled to the annex-j interface element 282. The decoupling of the analog port 262 may be performed under software control in the microprocessor 204. Further information pertaining to specifications of the annex-j interface 282 cab be found in the P1294A specification, which is hereby incorporated by reference.

The serializer filter circuit 284 element converts between parallel and serial data and is coupled to the bus 202. The serializer filter and annex-J interface element interrupts the microprocessor for status and control changes. The serializer filter 284 is also coupled to the annex-j DMA controller 286, which writes data received via the annex-j interface 282 to the local SRAM element 206. The annex-J DMA controller element interrupts the microprocessor for DMA pointer services.

The power management circuit 292 provides multiple power management modes for the interface 200. Program control in the microprocessor indicates to the power management circuit 292 a desired power state for the system, for example, automatic power-up and power-down. The power management circuit 292 can also be used to power-on and power-off selected ones of the analog ports 262. The power management circuit 292 is coupled to the IRQ controller 222 to interrupt the microprocessor for save-off and reload of the port state registers (not shown).

FIG. 3 is a flowchart of processing performed in transferring data from the interface 200 to the 1394 bus 101, in accordance with an example embodiment of the invention. While not illustrated, those skilled in the art will appreciate the operation of the example embodiments for incoming data from the 1394 bus to the interface 200.

The link layer software 102 receives a request from a host processor to transfer data as shown by block 302. The request includes a reference to the data along with a specification of the destination. The request also indicates whether the data type is asynchronous or isochronous, along with additional information as provided in the 1394 standard. The request is provided to the link layer software 102 in the processor by the host DMA controller 256, which is alerted to the request and retrieves the request. The host DMA controller 256 provides the request to the link layer software by writing the request to the local SRAM 206 via the local bus 108.

The link layer software 102 creates a packet for transfer from the received request, in the case of a data transfer from the local host processor 254. The link layer software formats the data in accordance with whether the data is asynchronous or isochronous, creates the necessary header information, and writes this data in the local SRAM 206 at a selected area for the packet, as shown by block 304.

At block 306, the link layer software 102 executing on the microprocessor 204 waits for a control signal from the time critical PHY control element 272 to request access to the 1394 bus. For example, if the link layer software has queued an asynchronous transfer, and the 1394 bus 101 is presently operating in the isochronous mode, the asynchronous transfer must wait for a sub-action gap indication from the time critical PHY control element 272. When the control signal is received, the link layer software notifies the PHY circuitry to arbitrate for bus access, as shown by block 308. In the example embodiment, the microprocessor 204 notifies the bus arbitration circuit via the local bus 202.

At block 310, the link layer software 102 waits for control of the 1394 bus. The link layer software receives 1394 bus information from the bus arbitration circuit or from the 8B10B support logic, depending upon whether the PHY circuit is operating in alpha mode or beta mode. It will be appreciated that the alpha mode is compliant with the 1394A specification, and beta mode is compliant with 1394B specification.

When bus access is granted, the packet is transferred at block 312 from the local SRAM 206 to the PHY serializer 266 or the 8B10B support logic 268 by the PHY DMA controller 270 at the initiation of the link layer software 102, depending on whether the interface is operating in alpha or beta mode. The packet is then processed in accordance with the 1394 standard and output on the analog ports.

Incoming packets from the 1394 bus are received by the analog ports 262. Comparison of the destination address in an incoming packet to local addresses is performed by the time critical PHY element 272. If the referenced address is local to the interface 200, the packet is written to the local SRAM 206. In addition, the PHY DMA controller 270 interrupts the microprocessor 204 to indicate arrival of the packet. If the referenced address is not local to the link layer software, the packet is discarded and not written in memory.

As noted above, the present invention is applicable to a variety of serial bus interfaces. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art upon review of the present specification. The claims are intended to cover such modifications and devices.

What is claimed is:

1. An interface circuit arrangement for coupling a host processor to an IEEE 1394 standard serial bus, comprising:
   a local bus;
   a processor coupled to the bus and configured and arranged to perform selected link layer functions of the IEEE 1394 standard;
   a read-only memory circuit coupled to the local bus and configured with instructions that cause the processor to perform the selected link layer functions;
   a random access memory circuit coupled to the bus and arranged for storage of data manipulated by the link layer functions; and
   a 1394 port interface circuit arrangement coupled to the bus and arranged to couple to the 1394 standard serial bus and transfer data between the random access memory and the 1394 bus via the local bus responsive to the processor performing the selected link layer functions.

2. The circuit arrangement of claim 1, wherein the microprocessor is an advanced RISC microprocessor.

3. The circuit arrangement of claim 1, wherein the port interface circuit arrangement comprises:
   a PHY DMA controller coupled to the local bus and arranged to transfer data between the random access memory and the 1394 bus; and
   a PHY serializer coupled to the PHY DMA controller and arranged to convert parallel data from the local bus to serial data for the 1394 bus and convert serial data from the 1394 bus to parallel data for the local bus.

4. The circuit arrangement of claim 3, further comprising a data formatting circuit arrangement coupled to the PHY DMA controller and arranged to encode and decode data transferred to and received from the 1394 bus, respectively, in accordance with selected formats of the IEEE 1394.B standard.

5. The circuit arrangement of claim 1, wherein the port interface circuit arrangement comprises:
   a PHY DMA controller coupled to the local bus and arranged to transfer data between the random access memory and the 1394 bus; and
   a data formatting circuit arrangement coupled to the PHY DMA controller and arranged to encode and decode data transferred to and received from the 1394 bus, respectively, in accordance with selected formats of the IEEE 1394.B standard.

6. The circuit arrangement of claim 1, wherein the port interface circuit arrangement comprises:
   a PHY DMA controller coupled to the local bus and arranged to transfer data between the random access memory and the 1394 bus; and
   a CRC generator coupled to the local bus and to the PHY DMA controller.

7. The circuit arrangement of claim 1, wherein the port interface circuit arrangement comprises a bus arbitration circuit coupled to the local bus and to the 1394 bus and arranged to arbitrate for control of the 1394 bus.

8. The circuit arrangement of claim 1, wherein the read-only memory is further configured with instructions for causing the processor to perform selected supplemental functions.

9. The circuit arrangement of claim 8, wherein the supplemental functions include encoding and decoding data according to a selected standard.

10. The circuit arrangement of claim 1, wherein the port interface circuit arrangement comprises an annex-j interface circuit arrangement coupled to the local bus and arranged to couple to PHY circuitry on a chip external to the processor.

11. The circuit arrangement of claim 1, wherein the port interface circuit arrangement comprises:
    a PHY DMA controller coupled to the local bus and arranged to transfer data between the random access memory and the 1394 bus; and
    a CRC generator coupled to the local bus and to the PHY DMA controller;
    a bus arbitration circuit arrangement coupled to the local bus and arranged to arbitrate for control of the 1394 bus; and
    an interrupt controller coupled to the processor, the PHY DMA controller, and the bus arbitration circuit arrangement.

12. The circuit arrangement of claim 11, wherein the supplemental functions include encoding and decoding data according to a selected standard.

13. The circuit arrangement of claim 12, further comprising
    a PHY serializer coupled to the PHY DMA controller and arranged to convert parallel data from the local bus to serial data for the 1394 bus and convert serial data from the 1394 bus to parallel data for the local bus; and
    a data formatting circuit arrangement coupled to the PHY DMA controller and arranged to encode and decode data transferred to and received from the 1394 bus, respectively, in accordance with selected formats of the IEEE 1394.B standard.

14. The circuit arrangement of claim 1, wherein the processor is an advanced RISC microprocessor, and the port interface circuit arrangement comprises:
    a PHY DMA controller coupled to the local bus and arranged to transfer data between the random access memory and the 1394 bus; and
    a PHY serializer coupled to the PHY DMA controller and arranged to convert parallel data from the local bus to serial data for the 1394 bus and convert serial data from the 1394 bus to parallel data for the local bus;
    a data formatting circuit arrangement coupled to the PHY DMA controller and arranged to encode and decode data transferred to and received from the 1394 bus, respectively, in accordance with selected formats of the IEEE 1394.B standard;
    a CRC generator coupled to the local bus and to the PHY DMA controller;
    a bus arbitration circuit arrangement coupled to the local bus and arranged to arbitrate for control of the 1394 bus; and
    an interrupt controller coupled to the processor, the PHY DMA controller, and the bus arbitration circuit arrangement; and
    an interrupt controller coupled to the processor, the PHY DMA controller, and the bus arbitration circuit arrangement.

15. The circuit arrangement of claim 14, wherein the port interface circuit arrangement comprises an annex-j interface circuit arrangement coupled to the local bus and arranged to couple to PHY circuitry on a chip external to the processor.

16. The circuit arrangement of claim 14, wherein the read-only memory is further configured with instructions for causing the processor to perform selected supplemental functions.

* * * * *